United States Patent [19]

Geke et al.

[11] Patent Number: 5,352,250
[45] Date of Patent: Oct. 4, 1994

[54] PROCESS OF TREATING LACQUER COAGULUM AND ITS USE

[75] Inventors: Juergen Geke, Duesseldorf; Lutz Huesemann, Haan; Hans-Joergen Rehm, Hilden, all of Fed. Rep. of Germany

[73] Assignee: Henkel Kommanditgesellschaft auf Aktien, Duesseldorf, Fed. Rep. of Germany

[21] Appl. No.: 50,128

[22] PCT Filed: Oct. 23, 1991

[86] PCT No.: PCT/EP91/02006
§ 371 Date: Apr. 30, 1993
§ 102(e) Date: Apr. 30, 1993

[87] PCT Pub. No.: WO92/07900
PCT Pub. Date: Mar. 14, 1992

[30] Foreign Application Priority Data

Oct. 31, 1990 [DE] Fed. Rep. of Germany ....... 4034596

[51] Int. Cl.⁵ .............................................. C02F 11/20
[52] U.S. Cl. ........................................ 34/391; 34/406; 210/710; 210/737; 210/770; 210/774; 210/930; 241/23
[58] Field of Search .................. 34/13, 62, 12, 60, 15; 210/710, 737, 751, 766, 770, 774, 930; 241/18, 23

[56] References Cited

U.S. PATENT DOCUMENTS

| | | | |
|---|---|---|---|
| 4,220,456 | 9/1980 | Block | 55/85 |
| 4,303,559 | 12/1981 | Trost | 260/2.3 |
| 4,380,495 | 4/1983 | Maher | 210/728 |
| 4,504,395 | 3/1985 | Harpel et al. | 210/712 |
| 4,541,931 | 9/1985 | Geke et al. | 210/728 |
| 4,564,464 | 1/1986 | Harpel et al. | 252/181 |
| 4,575,427 | 3/1986 | Ysern de Arce et al. | 210/774 |
| 4,629,477 | 12/1986 | Geke | 55/85 |
| 4,629,572 | 12/1986 | Leitz et al. | 210/714 |
| 4,701,220 | 10/1987 | Seng | 106/203 |
| 4,980,030 | 12/1990 | Johnson et al. | 203/4 |
| 5,202,034 | 4/1993 | Martel | 210/770 |
| 5,254,263 | 10/1993 | Gerace et al. | 210/751 |

FOREIGN PATENT DOCUMENTS

| | | |
|---|---|---|
| 0193668 | 3/1985 | European Pat. Off. . |
| 0376020 | 7/1990 | European Pat. Off. . |
| 3227227 | 7/1982 | Fed. Rep. of Germany . |
| 3316878 | 11/1984 | Fed. Rep. of Germany . |
| 3525254 | 7/1985 | Fed. Rep. of Germany . |
| 3412763 | 10/1985 | Fed. Rep. of Germany . |
| 4025729 | 8/1990 | Fed. Rep. of Germany . |
| 4025730 | 8/1990 | Fed. Rep. of Germany . |
| 0667450 | 10/1988 | Switzerland . |

*Primary Examiner*—Peter A. Hruskoci
*Attorney, Agent, or Firm*—Wayne C. Jaeschke; Norvell E. Wisdom, Jr.; Daniel S. Ortiz

[57] ABSTRACT

The invention relates to a process for treating (recycling) lacquer coagulum containing lacquer overspray and layered silicate containing coagulating agents, in which the layered silicate containing paint coagulum is vacuum dried, processed at low temperatures and then ground, and to the use of the processed paint coagulum as a basic component, additive, or filler in lacquers and paints, building materials, sealing materials, car underseal compositions or adhesives.

20 Claims, No Drawings

PROCESS OF TREATING LACQUER COAGULUM AND ITS USE

FIELD OF THE INVENTION

This invention relates to a process for working up (recycling) lacquer coagulum containing lacquer overspray and coagulant containing layer silicates, in which the lacquer coagulum containing layer silicates is dried in vacuo, treated at low temperatures and subsequently ground, and to the use of the lacquer coagulum thus worked up as a principal ingredient, additive or filler in lacquers and paints, building materials, sealing materials, undersealing compounds or adhesives.

STATEMENT OF RELATED ART

In the application of lacquers, waxes or similar coating materials containing water-insoluble organic substances to metal surfaces or plastic surfaces, for example in the automotive industry, the lacquers or coating materials cannot be completely applied to the parts to be coated. In the lacquering of motor vehicle bodies in particular, so-called overspray collects in the spray booths, being removed therefrom with water and flushed into a so-called "settling tank". In order, on the one hand, not to disrupt the function of water-carrying pipes, nozzles and sprinkler systems by tacky lacquer particles and, on the other hand, to remove the ingredients taken up from the circulating water, chemicals have to be added to the water to coagulate the substances mentioned. The chemicals added should detackify the sprayed lacquer particles taken up by the water and agglomerate them into a dischargeable coagulum in a single step.

In view of a growing environmental awareness, consideration has recently been given to me notion of using the lacquer coagulum collecting in industrial coating and lacquering plants as valuable raw materials in recycling strategies rather than disposing of them as waste. In addition, an amendment to the "*Technische Anleitung Abfall* (Technical Directive on Waste)" is about to be passed, banning the dumping and export of lacquer residues. The annual accumulation of lacquer residues is still put at around 250,000 t per year (VDI Nachrichten of Mar. 16, 1990), so that there is considerable useful material potential in the recycling of lacquer residues.

There has been no shortage of attempts to reduce the amount of overspray collecting by suitably designing the spray booths, to work up the lacquer sludges collecting via the spray booth water or to convert them into economically useful products. Thus. DE-A-32 27 227 describes a process, for recovering waterborne paint from the overspray collecting during lacquering with wet lacquers, which has been used for years in the electrophoretic processing of water-soluble electrophoretic lacquers. However, so-called solvent-containing lacquer waste cannot be worked up by this process.

The processing of lacquer sludges described in U.S. Pat. No. 4,303,559 essentially comprises grinding the sludge, drying the fragments obtained and regrinding the dried fragments. The particles obtained in this way may then be pressed and cured, for example to form sheets which may be used for insulation purposes.

In addition, DE-C-35 25 254 describes a process for reprocessing lacquer waste, in which the lacquer waste collected in crosslinkable form is convened into an aqueous dispersion by addition of suffactants, particularly anionic, cationic, nonionic or amphoteric surfactants, and application of mechanical forces. After curing under heat or pressure, the aqueous dispersions or emulsions obtained are used as vibrationdamping materials and as sound- and heat-insulating materials.

In addition, the above-cited article in VDI-Nachrichten describes the drying and utilization of lacquer coagulum by a "dry purge" concept which drives out hydrocarbens from the lacquer sludges without any emissions and converts the remaining resins into an odorless non-toxic powder. This powder has a calorific value of the order of 21,000 KJ/kg and may be used in cement kilns or heat generators.

Very recently, the lacquer residues purified by washing, particularly where the lacquer overspray is of one type only, have been freed from water in a kneader, made up with solvent and reused with calcium chloride as precipitant. On account of the known corrosive effect of chloride-containing compounds in the automotive industry, this method will presumably not be adopted.

DESCRIPTION OF THE INVENTION

Object of the Invention

Now, the problem addressed by the present invention was to provide a process for working up (recycling) lacquer coagulum containing layer silicates which would readily convert lacquer coagulum, particularly detackified lacquer coagulum, into a reusable form. In addition, the lacquer coagulum thus worked up would be of such a quality that it could be used as a principal ingredient, additive or filler in lacquers and paints, building materials, sealing materials, undersealing compounds or adhesives.

SUMMARY OF THE INVENTION

Accordingly, the present invention relates to a process for working up lacquer coagulum based on lacquer overspray coagulated in known manner with coagulants containing layer silicates, characterized in that the detackified lacquer coagulum containing layer silicates is dried in vacuo at temperatures of up to 100° C., the dried lacquer coagulum is exposed to temperatures of 0° to −270° C., and the cold brittle lacquer coagulum is ground immediately afterwards.

According to the invention, the recyclable lacquer coagulum containing layer silicates is obtained from circulating waters or coagulation pools of lacquer disposal plants by coagulation of lacquers, waxes and/or other coating materials, particularly lacquer overspray, with coagulants containing layer silicates.

Coagulants containing layer silicates, which may be used for the purposes of the present invention, are for example the lacquer coagulants known from U.S. Pat. Nos. 4,220,456, 4,380,495, 4,629,572, 4,504,395, 4,564,464 and 4,701,220 and from EP-A-193 668. The lacquer coagulants containing layer silicates described in German patent applications DE 40 20 730 and P 40 25 730.4 may of course also be used.

DESCRIPTION OF PREFERRED EMBODIMENTS

In one preferred embodiment of the present invention, the layer-silicate-containing coagulant used contains:

a) 1 to 100% by weight of at least one aluminosilicate, b) 0 to 30% by weight of at least one of silicic acid or an alkali metal salt and/or alkaline earth metal salt thereof, c) 0 to 30% by weight of at least one alkaline earth metal salt, d) 0 to 10% by weight of a cyanamide, dicyandiamide and/or calcium cyanamide.

e) 0 to 10% by weight of a protonareal or cationically modified polyethylene imine and f) 0 to 19% by weight of at least one active substance and/or auxiliary selected from the group consisting of molybdenum compounds, waxes and/or wax analogs, silicates, phosphates, emulsifiers and/or dispersion aids, foam inhibitors, corrosion inhibitors, biocides, acids, amines, and/or water.

According to the invention, the layer-silicate-containing coagulants contain as aluminosilicate component(s) one or more compounds from the group of clay minerals based on alkali metal and alkaline earth metal aluminosilicates, coagulants containing clay minerals based on magnesium aluminosilicate being particularly preferred. This merely means that the metal ions of the cation layers present between the silicate anion layers are alkali metal or alkaline earth metal ions, preferably magnesium ions.

In one preferred embodiment, the layer silicate-containing coagulants contain as aluminosilicate component(s) one or more mineral(s) from the group consisting of heidellite, bentonitc, bobes, dickitc, halloysite, hectorite, kaolinite, montmorillonite, nacrite and nontronite. Of these, bentonitc or hectorite or mixtures of the two minerals in any ratio are particularly preferred because they lead to coagulants having particularly good denaturing properties and a high coagulum discharge capacity.

Both here and in the following description and claims, "bentonites" and "hectorites" are understood to be silicate minerals of the above-described type which have a multilayer structure in which the individual layers do not have to be rigidly joined to one another, but instead are expanded by incorporation of water, for example, so that the minerals are swollen. In addition to aluminum, magnesium forms a large part of the cations in hectorites. In addition, the anionic layers contain fluoride incorporations. By contrast, bentonites are pure sodium aluminum silicates with a basic structure similar to montmorillonite. They can also be expanded by incorporation of a more or less large quantity of water, for example 2 to 7 times the molar quantity, in the cationic interlayers. Kaolinite, which is the principal constituent of kaolin, also has a multilayer structure consisting of silicate anions and aluminum cations.

The layer-silicate-containing coagulants may also contain one or more compounds from the group of silicic acid and/or alkali metal and alkaline earth metal salts thereof in addition to the aluminosilicate components. Of the salts, the metasilicates and pyrosilicates are particularly preferred; the compounds mentioned may be used individually or mixed in any ratio. Compounds such as these, which may be additionally used, are present in the coagulants in total quantities of preferably 0.1 to 30% by weight and, more particularly, 10 to 20% by weight, based on the total quantity of layer-silicate-containing coagulant. Talcum, a magnesium silicate having the approximate composition $Mg_3(OH)_2Si_4O_{10}$, is mentioned as a preferred example.

Other constituents of the layer-silicate-containing coagulants may be alkaline earth metal salts, preferably in a quantity of 0.1 to 30% by weight and, more particularly, 5 to 25% by weight. According to the invention, the salts of calcium and/or magnesium, particularly calcium carbonate, are preferably used.

In principle, the components of the layer-silicate-containing coagulant must be of such a quality that they interact in a way which can synergistically enhance the coagulation result. Cyanamides and/or dicyandiamide and/or calcium cyanamide, preferably in a quantity of 0.1 to 10% by weight, are mentioned as examples of such components. These compounds are known for use in lacquer coagulation from DE-A 34 12 763 where they are described in considerable detail so that there is no need for a further explanation at this juncture.

In addition, the polyethylene imines known from DE-A-33 16 878 and/or their protonated derivatives or derivatives cationically modified by alkylation may be used, preferably in a quantity of 0.1 to 10% by weight. The molecular weights of the polyethylene imines are preferably in the range from about $5 \times 10^4$ to $5 \times 10^7$ D.

According to the invention, the molybdenum compounds known from German patent application DE 40 25 729 may be used as active substances and/or auxiliaries. More particularly, the water-soluble alkali metal and/or ammonium salts of molybdic acid and/or isomolybdic acid, preferably sodium molybdate and/or ammonium molybdate, may be used in a quantity of 0.1 to 5% by weight as the molybdenum compounds.

Waxes and/or wax analogs of natural or synthetic origin may be used as further active substances and/or auxiliaries. Particulars of the waxes mentioned can be found in the specialist literature, for example in *Ullmanns Encyclopadie der technischen Chemie* [English translation: Ullmann's Encyclopedia of Technical Chemistry], Vol. 24, pages 1 to 49, 4th Edition, 1984 *Fette, Seifen, Anstrichmittel* [English translation: Fats, Soaps, and Coating Materials]67 (1965), 334 et seq.; and *Rompps Chemie-Lexikon* [English translation: Römpp's Chemical Dictionary], 8th Edition, (Franck'sche Verlagsbuchhandlung, Stuttgart, 1988), page 4562.

Preferred wax analogs are esters of saturated and/or unsaturated fatty acids containing 8 to 22 carbon atoms and preferably 12 to 18 carbon atoms with fatty alcohols containing 8 to 22 carbon atoms and preferably 12 to 18 carbon atoms or with glycerol. Of the group of suitable compounds, myricyl palmirate and tallow are particularly preferred.

The silicates used for this purpose are, for example, waterglasses or soluble or insoluble salts of orthosilicic acid and condensation products thereof or alehydrated derivatives thereof (metasilicic acids). Soluble or insoluble salts of orthophosphoric acid and condensation products thereof or alehydrated derivatives thereof are used as phosphates.

Basically, any of the compounds typically used for emulsifying purposes in aqueous solutions may be used as the emulsifiers and/or dispersion aids providing they are compatible with the other ingredients. Preferred emulsifiers are adducts of alkylene oxides with fatty acids or fatty alcohols which may be used individually or in the form of mixtures. Adducts of ethylene oxide with fatty acids, such as oleic acid and tallow fatty acid, the molar ratio of ethylene oxide to fatty acid being in the range from 1 to 5: 1, are preferred. Emulsifiers from this group of compounds show outstanding emulsifying power for the organic mixture components in the aqueous phase and provide the coagulants according to the invention with good detackifying power and problemtree discharge of the coagulum. An adduct of 1 to 4 moles of ethylene oxide with oleic acid is particularly preferred.

Other formulation auxiliaries are alkanolamines and/or amines. In preferred embodiments, they contain 1 to 3 carbon atoms in the alkylene or alkyl radical. One or more compounds from the group consisting of monoethanolamine, diethanolamine, triethanolamine, monoisopropanolamine, diisopropanolamine and triisopropanolamine are particularly preferred.

Special requirements, for example the adjustment of a certain pH value or the antimicrobial treatment of the coagulants, can be satisfied by the incorporation of special auxiliaries in the layer-silicate-containing coagulants. Thus, boric acid, which has an antimicrobial effect and may also contribute to pH adjustment, and biocides, for example formaldehyde, isothiazolines and derivatives thereof and pyridine-N-oxide and derivatives thereof, may optionally be added. Phosphoric acid, organic acids, such as citric acid, and other non-corrosive acids or acidic salts thereof may optionally be used for pH adjustment. Other possible constituents of the layer-silicate-containing coagulants are corrosion inhibitors and antifoam agents. Water-soluble salts of phosphonic acids and zinc salts, preferably the sodium salt of 2-phosphonobutane-1,2,4-tricarboxylic acid or the zinc salt of 2-pyridinethiol-1-oxide, are used as corrosion inhibitors. In addition to the foam inhibitors known for this purpose from the prior art, such as those containing mineral oil, the product Dehydran F ® (Henkel KGaA), which is free from mineral oil, may also be used as the antifoam agent.

The layer-silicate-containing coagulants mentioned can generally coagulate lacquer overspray of any origin. For example, fillers, primers, finishing lacquers and clear lacquers differing widely in their chemical composition may be used as the lacquers. The lacquers may contain pigments, fillers, corrosion-inhibiting pigments, etc. as additional constituents. The lacquers may also contain resins, such as alkyd, oilfree polyester, acrylate, reelamine, epoxy or polyurethane resins, and organic solvents, such as for example typical aromatic and aliphatic compounds, such as glycol esters, alcohols and water.

In one preferred embodiment of the invention, a completely detackified, pumpable layer-silicate-containing lacquer coagulum having a solids content of 20 to 95% by weight and preferably 30 to 50% by weight is used in the process according to the invention in the form of an aqueous slurry, sludge or powder.

In another preferred embodiment of the invention, the aqueous slurry, sludge or powder of the detackified layer-silicate-containing lacquer coagulum is dried at temperatures of 20° to 100 ° C. and preferably 60° to 80° C. in a vacuum of 0.01 to 900 mbar and preferably 10 to 100 mbar, with the proviso that a residual water content of less than 10% by weight and preferably less than 5% by weight is established. In principle, higher temperatures may also be applied, although it must be ensured that the lacquer coagulum is not completely hardened.

In another preferred embodiment of the process according to the invention, the dried lacquer coagulum is subjected to a low-temperature treatment at temperatures of 0° to −270° C. and preferably −150° to −220° C., using liquid nitrogen, liquid oxygen and/or liquid air, preferably liquid nitrogen, over periods of 5 to 60 minutes and preferably 20 to 40 minutes. In this low-temperature treatment, the lacquer coagulum is converted into a brittle form which considerably simplifies subsequent processing, such as grinding. The low-temperature treatment may of course also be carried out under vacuum conditions by a freeze-drying process.

Now, the key to the teaching according to the invention is the discovery that the cold brittle lacquer coagulum may be ground to a particle size of 1 to 500 μm and preferably 5 to 50 μm immediately after the low-temperature treatment by wet, pressure or impact size-reduction at room temperature. This is surprising insofar as many lacquer coagulant can only be inadequately ground on account of their tack and, in many cases, lead to unwanted clogging of the mill or the grinding tools.

The present invention also relates to the use of the lacquer coagulum worked up by the process according to the invention as a principal ingredient, additives or fillors in lacquers and paints, building materials, scaling materials, undersealing compositions, or adhesives.

According to the invention, therefore, the lacquer coagulum worked up by the process according to the invention may be reused both as a principal ingredient (100% recycling) and partly in the form of additives or fillers.

In one preferred embodiment of the present invention, the layer-silicate-containing lacquer coagulum worked up by the process according to the invention is directly dispersed as a lacquer or paint raw material with a lacquer solvent and/or water, applied to a metal or plastic surface by standard methods, stoved and used as a filler, primer, finishing lacquer and/or clear lacquer in the automotive industry.

The following Examples are intended to document the process according to the invention for working up a layer-silicate-containing lacquer coagulum and to illustrate the use of the lacquer coagulum as a lacquer raw material with reference to a characteristic example.

EXAMPLES

Production and working up of a layer-silicate-containing lacquer coagulum

Example 1

Lacquer type: solvent-containing filler quality (Mehnert & Veeck, Type AF 2000263)

Coagulant: VR 7821-3, supplier Henkel KGaA (based on about 85% by weight of layer silicates and 15% by weight of dicyandiamide)

The lacquer was coagulated in a Dürr ESKA installation under the conditions typically applied in the automotive industry.

Consistency of the lacquer coagulum: completely detackified

Solids content of the lacquer coagulum: 44%.

Working up

Drying in vacuo at 80° C. under a pressure of 20 mbar Residual water content: about 3%

Cold embrittlement of the dried material with liquid nitrogen Residence time: 30 minutes Grinding of the embrittled material in an air jet mill to a particle size of about 10 μm immediately after the low-temperature treatment.

Use of the lacquer coagulum worked up in accordance with Example 1 as a 100% lacquer raw material Mixing of the ground lacquer coagulum (50% by weight) with a solvent mixture (50% by weight) of butyl acetate and xylene (1:1)

Dispersion of the solvent/recycle lacquer coagulum mixture in a vibrating machine
Treatment time 30 minutes
Machine: type 3 A5-20 "Skandes" vibrating machine
Particle size obtained, as determined by the Hegmann method: about 40 μm
Application of the recycle lacquer thus obtained
Layer thickness of the lacquer coating (glass plate): 250 μm (solvent, wet)
Method: knife application
Airing time: 10 minutes at room temperature
Stoving: 10 minutes/150° C. in a recirculating air drying cabinet
Layer thickness after stoving: about 30 – 40 μm
Method: Efichsen-Uhr
König pendulum hardness (Erichsen): 80 – 90 secs.
Average required value in the automotive industry: 100 secs. ± 10.

The invention claimed is:

1. A process for preparing a lacquer coagulum in a reusable form which comprises:
   a) providing a wet lacquer coagulum produced from coagulating lacquer overspray with a layer-silicate-containing coagulant;
   b) drying the wet lacquer coagulum at a temperature of up to 100° under vacuum to form a dried lacquer coagulum with a water content less than 10% by weight;
   c) treating the dried lacquer coagulum at a temperature of from 0° to −270° C. to form a cold brittle lacquer coagulum; and
   d) immediately grinding the cold brittle lacquer coagulum to a particle size of 1–500 μm.

2. A process as claimed in claim 1, wherein the layer-silicate-containing coagulant comprises:
   a) 1 to 100% by weight of at least one aluminosilicate;
   b) 0 to 30% by weight of at least one silicic acid or alkali metal salt or alkaline earth metal salt thereof,
   c) 0 to 30% by weight of at least one alkaline earth metal salt,
   d) 0 to 10% by weight of at least one cyanamide or dicyandiamide,
   e) 0 to 10% by weight of a protonated or cationically modified polyethylene imine, and
   f) 0 to 19% by weight of at least one active substance or auxiliary selected from the group consisting of molybdenum compounds, waxes and wax analogs, silicates, phosphates, emulsifiers and dispersion aids, foam inhibitors, corrosion inhibitors, biocides, acids, amines and water.

3. A process as claimed in claim 2, wherein the layer-silicate-containing coagulant contains at least one aluminosilicate from the group consisting of bentonite and hectorite.

4. A process as claimed in claim 3, wherein the lacquer coagulum a layer-silicate-containing, detackified and pumpable lacquer coagulum having a solids content of 30 to 50% by weight is used.

5. A process as claimed in claim 4, wherein the lacquer coagulum is dried in vacuo under a pressure of 10 to 100 mbar and at temperatures of 60° to 80° C., to produce a dried lacquer coagulum with a residual water content of less than 5% by weight.

6. A process as claimed in claim 5, wherein the dried lacquer coagulum is subjected to a low-temperature treatment at temperatures of −150° to −220° C. with liquid nitrogen over a period of 20 to 40 minutes.

7. A process as claimed in claim 6, wherein the cold brittle lacquer coagulum is ground to a particle size of 5 to 50 μm at room temperature by wet, pressure or impact size reduction.

8. A process as claimed in claim 5, wherein the cold brittle lacquer coagulum is ground at room temperature to a particle size of 5 to 50 μm by wet, pressure or impact size reduction.

9. A process as claimed in claim 4, wherein the dried lacquer coagulum is treated at a temperature of −150° to −220° C. with liquid nitrogen, liquid oxygen or liquid air over a period of 20 to 40 minutes.

10. A process as claimed in claim 4, wherein the cold brittle lacquer coagulum is ground to a particle size of 5 to 50 μm by wet, pressure or impact size reduction at room temperature.

11. A process as claimed in claim 3, wherein the lacquer coagulum is dried in vacuo under a pressure of 10 to 100 mbar and at temperatures of 60° to 80° C., to produce a dried lacquer coagulum with a residual water content of less than 5% by weight.

12. A process as claimed in claim 3, wherein the dried lacquer coagulum is treated at a temperature of −150° to −220° C. with liquid nitrogen, liquid oxygen or liquid air over a period of 20 to 40 minutes.

13. A process as claimed in claim 3, wherein the cold brittle lacquer coagulum is ground to a particle size of 5 to 50 μm by wet, pressure or impact size reduction at room temperature.

14. A process as claimed in claim 2, wherein the layer-silicate-containing coagulant contains at least one aluminosilicate selected from the group consisting of beidellite, bentonite, bobes, dickite, halloysite, hectorite, kaolinite, montmorillonite, nacrite and nontronite.

15. A process as claimed in claim 2, wherein the lacquer coagulum is a layer-silicate-containing, detackified and pumpable lacquer coagulum having a solids content of 20 to 95% by weight.

16. A process as claimed in claim 2, wherein the lacquer coagulum is dried in vacuo under a pressure of 10 to 100 mbar and at temperatures of 60° to 80° C., to produce a dried lacquer coagulum with a residual water content of less than 5% by weight.

17. A process as claimed in claim 2, wherein the dried lacquer coagulum is treated at a temperature of −150° to −220° C. with liquid nitrogen, liquid oxygen or liquid air over a period of 5 to 60 minutes.

18. A process as claimed in claim 1, wherein the lacquer coagulum is a layer-silicate-containing, detackified and pumpable lacquer coagulum having a solids content of 20 to 95% by weight.

19. A process as claimed in claim 1, wherein the lacquer coagulum is dried in vacuo under a pressure of 0.01 to 900 mbar and at temperatures of 20° to 100° C.

20. A process as claimed in claim 2, wherein the cold brittle lacquer coagulum is ground to a particle size of 1 to 500 μm by wet, pressure or impact size reduction at room temperature.

* * * * *

UNITED STATES PATENT AND TRADEMARK OFFICE
CERTIFICATE OF CORRECTION

PATENT NO. : 5,352,250
DATED : October 4, 1994
INVENTOR(S) : Geke et. al.

It is certified that error appears in the above-indentified patent and that said Letters Patent is hereby corrected as shown below:

In claim 4, column 7, line 56, after coagulum insert:
-- is --.

In claim 4, column 7, line 58, delete:
-- is used --.

Signed and Sealed this

Eighteenth Day of July, 1995

Attest:

BRUCE LEHMAN

Attesting Officer     Commissioner of Patents and Trademarks